A. FOUCHY.
TIP CAR.
APPLICATION FILED AUG. 11, 1919.
1,409,694. Patented Mar. 14, 1922.
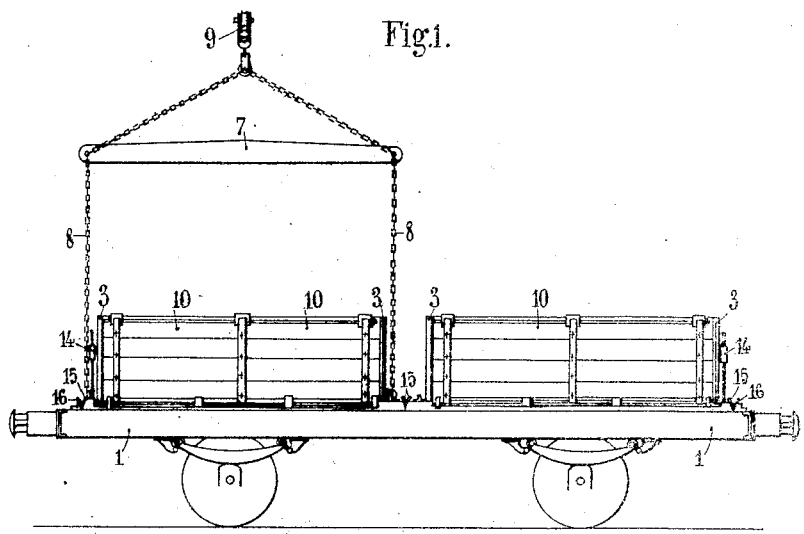
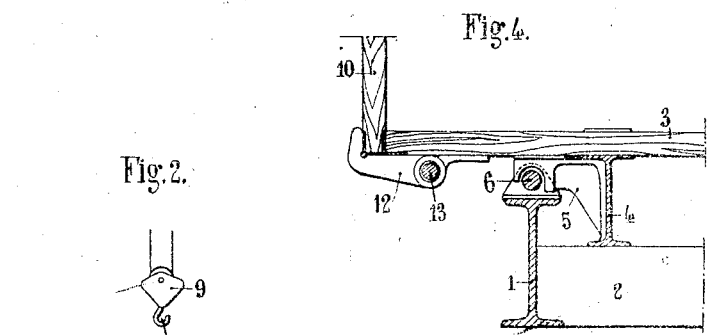
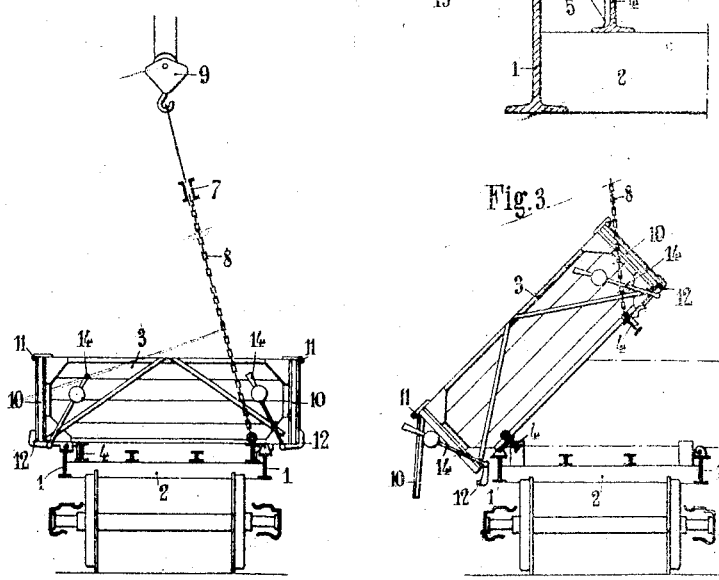
Inventor
A. Fouchy
By R. R. Houslee
Attorney

UNITED STATES PATENT OFFICE.

ALBERT FOUCHY, OF PARIS, FRANCE, ASSIGNOR OF ONE-HALF TO LA COMPAGNIE DES TRANSPORTEURS SIMPLEX, OF PARIS, FRANCE.

TIP CAR.

1,409,694.   Specification of Letters Patent.   Patented Mar. 14, 1922.

Application filed August 11, 1919. Serial No. 316,642.

*To all whom it may concern:*

Be it known that I, ALBERT FOUCHY, a citizen of the French Republic, residing at 43 Rue Lafayette, Paris, France, have invented certain new and useful Improvements in Tip Cars, of which the following is a specification.

In the case of tip cars of the Decauville type, it has already been proposed to mount the car bodies on trunnions so as to enable the car bodies to be tipped by rotation around an axis passing through their longitudinal symmetry plane. In such a case the car platform is provided at its ends with vertical uprights for supporting the trunnions of a car body.

In the case of railroad cars where the car body is permanently fixed to the car platform, it has been proposed to provide at the discharging hoppers, tipping devices for causing the longitudinal or transverse tipping of the entire car (platform and body). Those constructions however are costly because they require complicated operating apparatus.

The present invention has for its object to provide an improved railroad car wherein the car body can be tipped relatively to the car platform similarly to the Decauville cars, but contrarywise to those known constructions.

The lateral discharge of the contents of the car body takes place by gravity through the opened sides of the car body.

The embodiment of this invention is illustrated by way of example in the accompanying drawings in which:—

Fig. 1 is a side elevation of the combined improved car and tipping apparatus.

Fig. 2 is a vertical cross section thereof.

Fig. 3 is a view similar to Fig. 2 but showing the parts in their operating position.

Fig. 4 is a vertical cross section, drawn to a larger scale, of a detail.

The car platform is composed of two I beams 1 stayed together by cross members 2. This platform is adapted to carry two car bodies 3 of wood, wood metal or wholly of metal, supported by four longitudinals 4 and connected to members 5 journalled to trunnions 6 mounted on the longitudinals 1 of the car platform.

These various parts are so arranged as to enable the car body to tip around the trunnions of one of the longitudinals constituting the car platform, by raising the opposite longitudinal of the car body by means of a spreader beam 7, chains 8 and a windlass 9 of any kind.

The symmetrical arrangement of the parts allows moreover of tipping the car body to the one side or to the other of the platform as desired by utilizing as a fulcrum the trunnions of one or the other longitudinals.

The car bodies 3 are provided with doors 10 which can be hinged at their upper parts on hinge pins 11, and kept closed at their lower ends by hooks 12 mounted on a shaft 13 that is actuated by a lever 14 which is counterweighted.

The counterweighted lever 14 will, as readily seen from the drawings, automatically unhinge the hooks 12 when one of the car bodies has been tipped beyond a definite angle.

At each end of the longitudinals 4 carrying the car bodies, there are fixed parts 15 of curved sector shape. Those parts 15 that are fixed at the inner ends of the longitudinals between the two car bodies, abut against each other, whereas those that are fixed to the outer ends of the longitudinals are arranged to abut against other similarly curved parts 16 fixed to the under-carriage of the car.

When one of the car bodies 3 has been tipped, and its panel door has been opened by unhinging the hooks 12 by means of the lever 14 for the purpose of emptying the contents of the car body, it will be sufficient to allow the windlass which is maintaining the car body in the tipped position, to descend, whereupon the car body will automatically resume its original position on the car platform.

The car body is maintained in its normal position, transversely by the pivot members 5 that rest upon the trunnions 6 and longitudinally by the curved parts 15 which abut respectively against each other and against corresponding parts 16.

The car bodies are thus held by the car platform in such a manner that they can not become shifted during transport.

It is to be understood that the constructional form of the improved apparatus herein described and illustrated in the accompanying drawings is given solely by way of example, and that the constructional forms, accessories and dimensions may vary without departing from the nature of the invention. For instance the platform may carry only one car body or it may carry three or four or any desired number as required.

What I claim is:—

In a tip car, the combination with a car platform having supporting members located on the longitudinal sides thereof of one or more side-discharging car bodies, separate from the car platform adapted to rest normally on said supporting members and to pivot on the latter alternately, an outwardly opening door hinged at its upper end in each longitudinal side of said car body, hooks mounted on a shaft for holding the lower ends of each door in the closing position, and a counterweighted lever mounted on said shaft and adapted when the car body is in its normal position to hold said hooks in the latched position and for unhinging said hooks to unlatch that one of said doors that is situated on the tipping side when the car body is tilted.

In testimony whereof I have signed my name to this specification.

ALBERT FOUCHY.